United States Patent [19]

Tsao

[11] Patent Number: 5,687,190

[45] Date of Patent: Nov. 11, 1997

[54] NON-COHERENT DIRECT SEQUENCE SPREAD SPECTRUM RECEIVER FOR DETECTING BIT/SYMBOL CHIP SEQUENCES USING THRESHOLD COMPARISONS OF CHIP SEQUENCE CORRELATIONS

[75] Inventor: C. H. Alex Tsao, Saratoga, Calif.

[73] Assignee: OTC Telecom, San Jose, Calif.

[21] Appl. No.: 546,228

[22] Filed: Oct. 20, 1995

[51] Int. Cl.$^6$ .................................................. H04B 1/707
[52] U.S. Cl. ............................................ 375/206; 375/207
[58] Field of Search .................................. 375/206, 207, 375/208, 209, 210, 343, 359

[56] References Cited

U.S. PATENT DOCUMENTS

| | | | |
|---|---|---|---|
| 4,648,098 | 3/1987 | Kerr | 375/274 |
| 4,930,139 | 5/1990 | Chandler et al. | 375/207 |
| 4,930,140 | 5/1990 | Cripps et al. | 370/342 |
| 4,979,183 | 12/1990 | Cowart | 375/206 |
| 4,995,052 | 2/1991 | Thorvaldsen | 375/206 |
| 5,029,180 | 7/1991 | Cowart | 375/206 |
| 5,090,024 | 2/1992 | Vander Mey et al. | 375/204 |
| 5,132,986 | 7/1992 | Endo et al. | 375/209 |
| 5,146,471 | 9/1992 | Cowart | 375/208 |
| 5,157,686 | 10/1992 | Omura et al. | 375/200 |
| 5,166,952 | 11/1992 | Omurg et al. | 375/200 |
| 5,189,683 | 2/1993 | Cowart | 375/206 |
| 5,214,669 | 5/1993 | Zarembowitch | 375/200 |
| 5,239,496 | 8/1993 | Vancraeynest | 364/728.03 |
| 5,253,268 | 10/1993 | Omura et al. | 375/200 |
| 5,285,471 | 2/1994 | Kurihara | 375/200 |
| 5,365,516 | 11/1994 | Jandrell | 370/335 |
| 5,452,328 | 9/1995 | Rice | 375/210 |

*Primary Examiner*—Stephen Chin
*Assistant Examiner*—Jeffrey W. Gluck
*Attorney, Agent, or Firm*—Fenwick & West LLP

[57] ABSTRACT

A method and apparatus for transmitting and receiving a direct sequence spread spectrum signal encoded using two or more chip sequences to encode an information signal. The encoded information signal is received using a bank of matched filters (501a–501l), a bank of threshold comparators (505a–505l), a non-frequency locked bit clock circuit (509, 509') and a bit detector (510). Frequency locking is avoided by performing correlation on both the I- and Q-baseband signals and by logically combining the correlation results to recover the bit clock. In one embodiment, the method and apparatus uses binary phase shift keying to modulate the direct sequence spread spectrum signal with a carrier. In another embodiment, quadrature phase shift keying is used.

10 Claims, 9 Drawing Sheets

NON-COHERENT DIRECT SEQUENCE SPREAD SPECTRUM RECEIVER FOR DETECTING BIT/SYMBOL CHIP SEQUENCES USING THRESHOLD COMPARISONS OF CHIP SEQUENCE CORRELATIONS

TECHNICAL FIELD

This invention relates to the modulation and demodulation of radio frequency signals and more particularly to a spread spectrum transceiver using direct sequence modulation.

BACKGROUND ART

Spectrum spreading techniques are widely used in digital communications. Early spread spectrum systems were used in military applications to combat the jamming of radio and satellite links or to effect a secured communication system. Spread spectrum communications, however, is increasingly used in non-military applications such as wireless communication, local area networks (LANs), personal communications networks (PCNs), and cellular telephone networks. Additionally, Federal Communications Commission (FCC) Rule 15.247, which allows license-free operation of spread spectrum transceivers (subject to certain power restrictions and spreading requirements) within the Industrial, Scientific, and Medical (ISM) bands: 902–928 MHz, 2400–2483.5 MHz, and 5725–5850 MHz, has created a demand for low cost spread spectrum transceivers that meet the power and spreading requirements of the FCC rule. Specifically, the rule presently requires that the power of the transmission signal not exceed 1 watt and have a randomness corresponding to a chip sequence length of 10 or greater if direct sequence spread spectrum modulation is used.

Generally, spread spectrum systems operate on narrow band communication signals by "spreading" their energy over a wide frequency range to create a broad-band signal having substantially the same power as the narrow-band signal. A receiver using the same spreading function as the transmitter can recover the original narrow band communication signal.

Spread spectrum transceivers generally use any one of several methods to spread the narrow-band, information-bearing communication signal over a specified frequency band. These methods include direct sequence modulation, frequency hopping, time hopping, chirp modulation, or variants thereof, or a hybrid combination of any of these methods. A transceiver using direct sequence modulation conventionally expands the bandwidth of a narrow-band digital signal I(n) using a "chip sequence" $C_i$ having a higher data rate than that of the narrow-band signal. The "chip sequence" is a pseudo-random bit sequence (also called a chip code) and in some transceivers is used to modify the narrow-band digital signal I(n) by replacing each "0" bit of I(n) with the chip sequence $C_i$ or a portion of the chip sequence $C_i$ and by replacing each "1" bit of I(n) with the complement (logical inverse) of $C_i$ or a portion of the chip sequence $C_j$. In other transceiver designs, different code sequences are used for "0" and "1" bits. Using this method, each data bit of I(n) is thereby transformed into a "symbol" (a series of "0"s and "1"s) where the symbol length equals the length of the chip sequence or the length of the selected portion of the chip sequence. Thus, the symbol frequency equals the information signal bit rate and the chip frequency equals the symbol frequency times the number of chips used to represent the symbol.

After the narrow-band information signal has been "spread" using the chip sequence, the resulting broad-band signal is generally transmitted by phase modulating a carrier wave using a conventional modulation technique such as Binary Phase Shift Keying (BPSK) or Quadrature Phase Shift Keying (QPSK). Conventionally, the carrier wave is generated using a local oscillator on the transmitter. In a BPSK scheme, the "0" and "1" transmission data is encoded by phase shifting the carrier wave by either 0 or 180 degrees in response to whether a "0" or a "1" is to be transmitted. In a QPSK scheme, the transmission data is also encoded by phase shifting the carrier; however, the carrier shifts between one of four phases to represent the four symbols formed by combining two bits: "00", "01", "10" and "11".

Conventional receivers demodulate the transmitted phase shift keyed signal to recover a digital direct sequence spread spectrum signal. Receivers can be either "coherent" or "non-coherent" with respect to the carrier wave frequency. Coherent receivers have carrier phase recovery circuitry or another means to frequency-lock the local oscillator to the carrier frequency of the received signal. Non-coherent receivers use a local oscillator which does not track the carrier frequency of the received signal to convert the received signal to in-phase and quadrature-phase baseband signals. The in-phase and quadrature-phase baseband signals in such a non-coherent receiver have an envelope which oscillates at a frequency equal to the frequency difference between the carrier frequency and the downconverting sinusoid generated by the local oscillator of the receiver. After the received signal is converted down to baseband, the information signal is conventionally recovered using matched filters to detect correlation with a specific spreading code sequence and a phase locked loop (PLL) to track and lock to the symbol frequency (code sequence frequency). Use of phase locked loop circuitry in a receiver has several drawbacks including complexity of design, cost to implement and limitations on operating frequency range of the receiver.

Thus, there is a need for a spread spectrum transceiver that complies with the requirements of FCC Rule 15.247, and that has a low-cost receiver that does not require frequency locking on either the carrier frequency or the symbol (chip sequence) frequency.

DISCLOSURE OF INVENTION

In accordance with the present invention, there is provided a non-coherent method and apparatus for recovering an information signal from a carrier frequency phase modulated by a direct sequence frequency spread signal having a plurality of chip sequences each representing an information symbol. The method and apparatus does not require phase locking on either the carrier frequency or the symbol (chip sequence) frequency. The phase modulated signal is mixed by mixers with the CW (continuous wave) signal generated by a non-coherent local oscillator and a 90 degree phase shifted form of the CW signal to form downconverted baseband in-phase and quadrature-phase signals (I and Q signals respectively) on in-phase and quadrature-phase channels (I and Q channels respectively). A bank of matched filters are coupled to each of the I and Q channels to correlate the I and Q signals with each chip sequence. The matched filter outputs are coupled to a bank of threshold comparators for comparing the correlation results to a set of predetermined threshold values to determine whether a chip sequence match has been found. The threshold comparator outputs are coupled to a bit clock circuit for generating a bit clock signal responsive to any one comparator output indicating a symbol match. The bit clock circuit also generates a symbol detect signal for each chip sequence indicating a detection of the associated chip sequence. The bit clock circuit outputs are coupled to a bit detector to generate the recovered information signal from the symbol detect signals and the bit clock signals.

In one embodiment, the phase modulated direct sequence frequency spread signal is a BPSK signal having chip sequence C1 substituted for a first bit state such as the "0" state (a "0" symbol) and chip sequence C2 substituted for a second bit state such as the "1" state (a "1" symbol). In this embodiment, bit clock circuit has a symbol detection circuit for detecting a C1 or C2 symbol match using the outputs of threshold comparators. In one embodiment, symbol detection circuit includes two "OR" gates and the bit clock is generated using an "OR" gate to perform a logical "OR" on the outputs of "OR" gates. In one embodiment, bit clock circuit also includes a bit clock validation circuit to reduce the likelihood of a false bit clock detection. Bit clock validation circuit includes a counter and a pulse generator.

In another embodiment, the phase modulated direct sequence frequency spread signal is a QPSK signal having chip sequences C1, C2, C3 and C4. In this embodiment, two bit clock circuits and two bit detectors are used to detect the symbol and recover the bit clock. The information signal is reconstructed using combiner to combine the outputs of bit detectors.

DETAILED DESCRIPTION OF THE PREFERRED EMBODIMENTS

Figure 1:
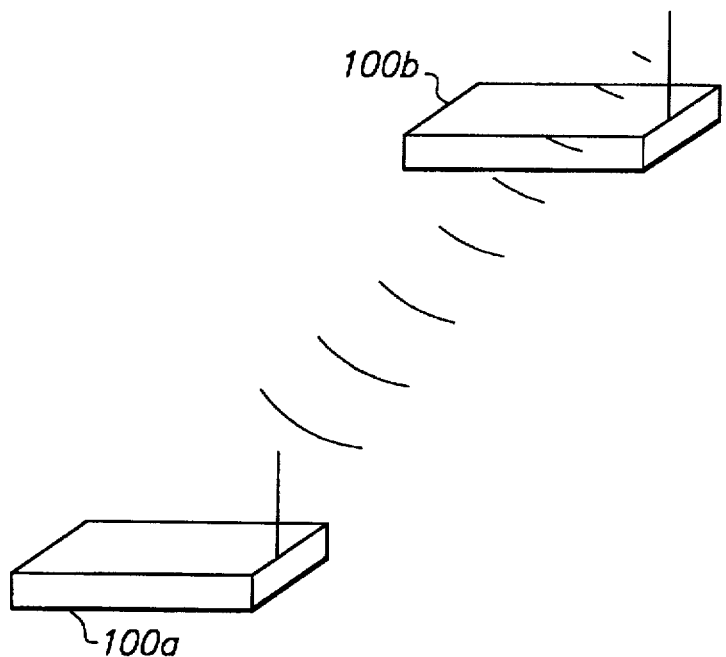
FIG. 1 is a pictorial illustration of a transceiver system having transceivers 100a and 100b in accordance with the present invention.

FIG. 1 is a pictorial illustration of transceivers 100a and 100b in accordance with the present invention. Each transceiver 100a, 100b is a half duplex transceiver for transmitting and receiving direct sequence spread spectrum signals. In operation each transceiver 100a, 100b is set to either transit or receive mode at any moment in time. Transceivers 100a, 100b preferably have identical designs as illustrated in the block diagram of FIG. 2. For the purposes of illustration, transceiver 100a is selected as the transmitting transceiver and transceiver 100b is selected as the receiving transceiver.

Figure 2:
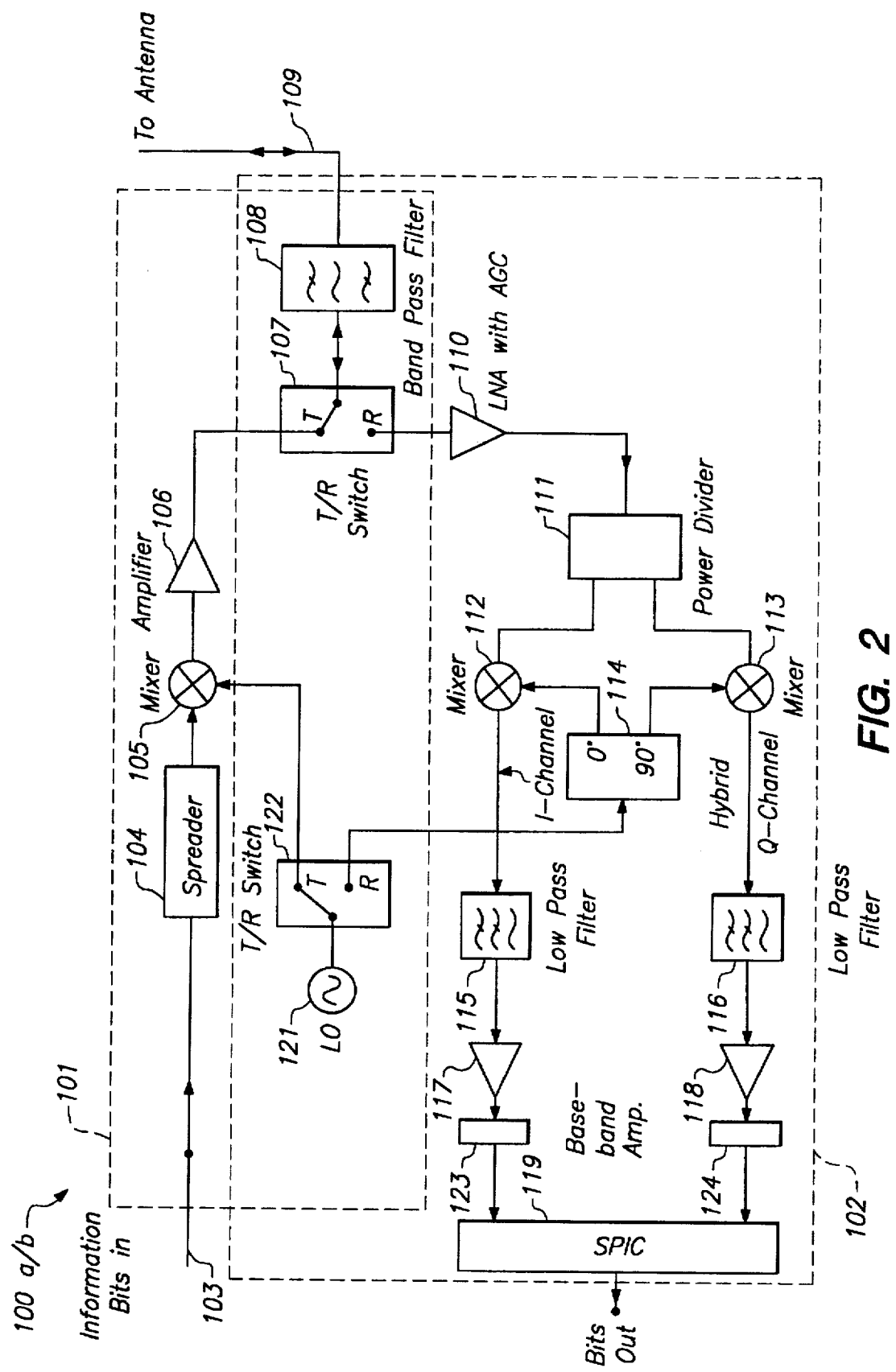
FIG. 2 is a block diagram of a BPSK transceiver 100 in accordance with the present invention.

FIG. 2 is a block diagram of a spread spectrum transceiver 100 in accordance with the present invention. Transceiver 100 includes a transmitter 101 and a receiver 102. Transmitter 101 and receiver 102 form a half-duplex transceiver and thus share circuit components such as local oscillator 121, local oscillator switch 122, antenna 109, bandpass filter 108, and antenna switch 107. In addition to the shared circuit components, transmitter 101 includes input port 103, spreader 104, mixer 105, and transmitter amplifier 106. In addition to the shared circuit components, receiver 102 includes receiver amplifier 110, splitter 111, mixers 112, 113, 90 degree hybrid 114, low pass filters 115, 116, baseband amplifiers 117, 118, analog-to-digital converters 123, 124 and signal processing circuit 119. Transceiver 100 operates in a half duplex mode to send and receive digital communication signals using a direct sequence spread spectrum technique.

In operation, a narrow-band information bearing signal I(n) is frequency spread, modulated and then transmitted by transmitter 101 of transceiver 100a. The transmitted signal is received, downconverted and then decoded by a receiver 102 of another, remotely placed, transceiver 100b.

I. Transmitting Apparatus and Method using BPSK Modulation

Figure 3:
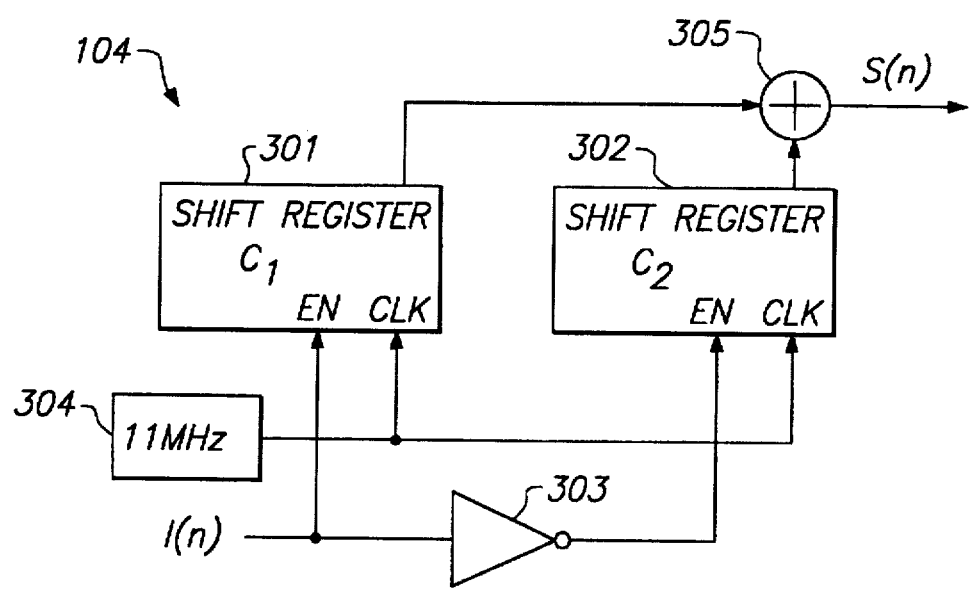
FIG. 3 is a block diagram of a spreader 104 in accordance with the BPSK transceiver 100 of FIG. 2.

A narrow-band information-bearing digital signal I(n) is received at input port 103 from an information signal source. Spreader 104 is coupled to input port 103 to receive information signal I(n). Now referring to FIG. 3, there is illustrated a block diagram of a spreader 104 in accordance with the present invention. Spreader 104 uses shift registers 301, 302, logical "OR" gate 305 and inverter 303 to generate chip sequences $C_1$ and $C_2$ respectively. Both shift registers are clocked at a desired chip rate by clock generator 304 and are enabled responsive to I(n) being either a "1" or a "0."

Spreader 104 uses two chip sequences, $C_1$ and $C_2$, (also expressed $C_1(n)$ and $C_2(n)$) to spread the signal energy of information signal I(n) over a desired frequency band. $C_1$ and $C_2$ are both pseudo-random sequences of chips (bits), either 0's or 1's. In accordance with the present invention $C_1$ and $C_2$ each have small valued autocorrelation functions except at m=0, where autocorrelation ($R_{C1}(m)$, $R_{C2}(m)$) is defined as:

$$R_{C1}(m) = |\Sigma C_1(n) \oplus C_1(n-m)|$$
$$R_{C2}(m) = |\Sigma C_2(n) \oplus C_2(n-m)|$$

where $\oplus$ is the exclusive "OR" summation which follows the rule that $1\oplus 1=1$, $0\oplus 0=1$, $1\oplus 0=-1$, and $0\oplus 1=-1$. Additionally, $C_1(n)$ and $C_2(n)$ are "nearly" orthogonal with respect to each other, meaning that their cross-correlation function is small for each value of m, where cross-correlation is defined as:

$R_{C1,C2}(m) = \Sigma C_1(n)C_2(n-m)$

In the preferred embodiment, $C_1$ and $C_2$ are chip code sequences having the desired properties of (1) a small-valued autocorrelation function except at m=0 and (2) a small-valued cross-correlation for each value of m. It should be noted, however, that the principles of the present invention apply to transceivers using other chip sequences having similar autocorrelation and cross-correlation properties, including chip sequences of other lengths and derived using other methods.

In the preferred embodiment, $C_1$ and $C_2$ are 11 chip sequences where:

$C_1=10111000101$ $C_2=00110110001$

As shown in Table 1, chip sequence $C_1$ has an autocorrelation ($R_{C1}(m)$) of 11 at m=0 and an autocorrelation no greater than 1 for other values of m.

TABLE 1

| m | $C_1$(n-m) | $R_{C1}(m)$ |
|---|---|---|
| 0 | 10111000101 | 11 |
| 1 | 11011100010 | 1 |
| 2 | 01101110001 | 1 |
| 3 | 10110111000 | 1 |
| 4 | 01011011100 | 1 |
| 5 | 00101101110 | 1 |
| 6 | 00010110111 | 1 |
| 7 | 10001011011 | 1 |
| 8 | 11000101101 | 1 |
| 9 | 11100010110 | 1 |
| 10 | 01110001011 | 1 |

As shown in Table 2, chip sequence $C_2$ has an autocorrelation ($R_{C2}(m)$) of 11 at m=0 and an autocorrelation no greater than 5 for other values of m.

TABLE 2

| m | $C_2$(n-m) | $R_{C2}(m)$ |
|---|---|---|
| 0 | 00110110001 | 11 |
| 1 | 10011011000 | 1 |
| 2 | 01001101100 | 5 |
| 3 | 00100110110 | 3 |
| 4 | 00010011011 | 3 |
| 5 | 10001001101 | 5 |
| 6 | 11000100110 | 5 |
| 7 | 01100010011 | 3 |
| 8 | 10110001001 | 3 |
| 9 | 11011000100 | 5 |
| 10 | 01101100010 | 1 |

As shown in Table 3, chip sequences $C_1$ and $C_2$ have a cross-correlation ($R_{C12}(m)$) of no greater than 5 for each value of m.

TABLE 3

| m | $C_2$(n-m) | $R_{c12}(m)$ |
|---|---|---|
| 0 | 00110110001 | 1 |
| 1 | 10011011000 | 1 |
| 2 | 01001101100 | 3 |
| 3 | 00100110110 | 3 |
| 4 | 00010011011 | 3 |
| 5 | 10001001101 | 5 |
| 6 | 11000100110 | 3 |

TABLE 3-continued

| m | $C_2$(n-m) | $R_{c12}(m)$ |
|---|---|---|
| 7 | 01100010011 | 3 |
| 8 | 10110001001 | 5 |
| 9 | 11011000100 | 5 |
| 10 | 01101100010 | 3 |

Although the principles of the present invention apply to information signals of varying bit rates, in the preferred embodiment, I(n) has a 1 megahertz (MHz) bit rate and therefore, $C_1$ and $C_2$ have an 11 MHz chip rate.

Figure 4A:
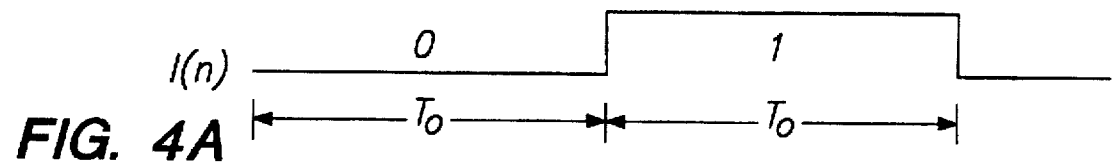
FIG. 4A is an illustration of an information signal in accordance with the present invention.
Figure 4B:
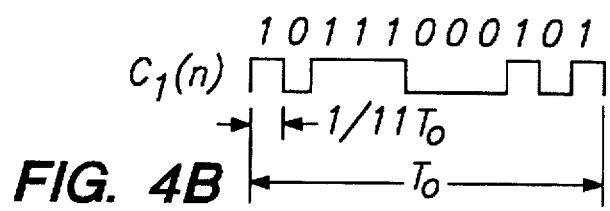
FIG. 4B is an illustration of a first chip sequence C1 in accordance with the present invention.
Figure 4C:
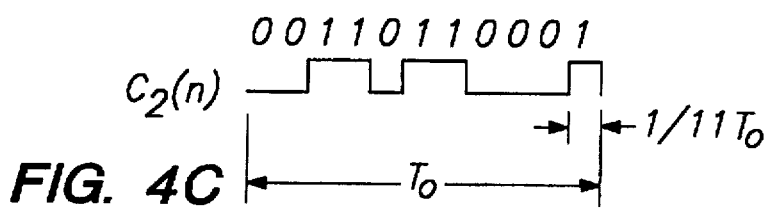
FIG. 4C is an illustration of a second chip sequence C2 in accordance with the present invention.
Figure 4D:
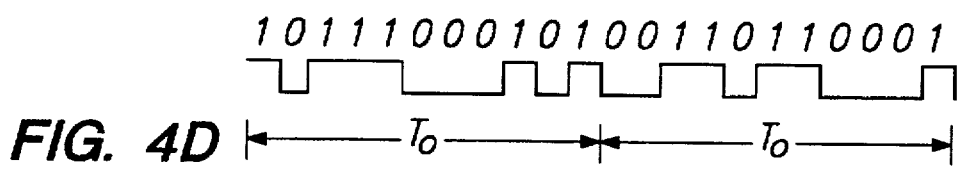
FIG. 4D is an illustration of a frequency spread signal in accordance with the present invention.

FIGS. 4A–4D illustrate the relationship among information signal I(n), chip sequences $C_1$ and $C_2$, and spread signal S(n). Specifically, FIG. 4A illustrates an information bearing signal I(n) (at 1 MHz) as may be received at input port 103. FIGS. 4B and 4C illustrate chip sequences $C_1$ and $C_2$ respectively, each having an 11 MHz chip rate. FIG. 4D illustrates a frequency spread signal S(n) (corresponding to I(n)) generated by spreader 104. Frequency spread signal S(n) has an 11 MHz chip rate. Frequency spread signal S(n) encodes information signal I(n) by replacing each "0" bit with chip sequence $C_1$(n) and each "1" with chip sequence $C_2$. Thus, chip sequence $C_1$ is a "0" symbol and chip sequence $C_2$ is a "1" symbol.

Referring again to FIG. 2, mixer 105 is coupled to spreader 104 and to local oscillator 121 via switch 122. Local oscillator 121 generates a sinusoidal carrier (cosωt) having a frequency of ω corresponding to the frequency of local oscillator 121. Local oscillator switch 122 has two output terminals T and R coupled to transmitter and receiver 101, 102 respectively. Local oscillator switch 122 couples the local oscillator signal to the transmit path when transceiver 100 is in transmit mode and to the receive path when transceiver 100 is in receive mode.

Mixer 105, local oscillator 121 and oscillator switch 122 form a Binary Phase Shift Keyed (BPSK) modulator. Mixer 105 mixes oscillator signal cosωt with the frequency spread signal S(n) to produce a BPSK signal:

S(t)cosωt

Transmitter amplifier 106 is coupled to mixer 105 and amplifies BPSK signal S(t)cosωt to produce a transmission signal. Amplifier 106 is coupled to antenna switch 107. Antenna switch 107 has two terminals T and R coupled to transmitter and receiver 101, 102 respectively. When transceiver 100a is in transmit mode, bandpass filter 108 and antenna 109 are coupled to the transmit path. When coupled to the transmit path, bandpass filter 108 filters the transmission signal and couples the filtered signal to antenna 109 for radiation.

II. Receiving Apparatus and Method using BPSK Modulation

A corresponding transceiver 100b, set to receive mode, is equipped to receive and demodulate the radiated direct sequence spread spectrum signal. When transceiver 100b is in receive mode, antenna 109 and bandpass filter 108 are coupled to the receive path by switch 107. The signal received by antenna 109 has an arbitrary and unknown phase shift φ due to signal propagation delay and other factors, and therefore the received signal may be expressed as S(t)cos (ωt+φ). The received signal is filtered using bandpass filter 108 which couples antenna 109 to receiver amplifier 110. Receiver amplifier 110 is a low noise amplifier with automatic gain control for amplifying the filtered signal to a desired level. Receiver amplifier 110 is coupled to power divider 111. Power divider 111 is an in-phase splitter that splits the amplified signal to couple the amplified signal $S(t)\cos(\omega t+\phi)$ to both the I-Channel (the in-phase channel) and the Q-Channel (the quadrature-phase channel) for downconversion and baseband processing.

Receiver 102 of transceiver 100*b* has a 90 degree hybrid 114 selectively coupled to local oscillator 121 via local oscillator switch 122. Local oscillator 121 generates a sinusoid (cos ω't) having a frequency ω'. The frequency ω of local oscillator 121 of transceiver 100*a* and the frequency ω' of local oscillator 121 of transceiver 100*b* vary within a specified tolerance range. The frequency difference between ω and ω' is expressed as:

$$\Delta\omega = \omega - \omega'$$

It should be noted that ω and ω' vary by no more than twice the tolerance specified in the design of the local oscillator circuit 121 on each of the transceivers 100*a*, 100*b*. In one embodiment, the specified tolerance is:

$$\Delta f/f_o < 1/(32*R)$$

where $\Delta f$ represents the inaccuracy of the frequency, $f_o$ is the nominal carrier frequency and R is the data bit rate.

Figure 5:
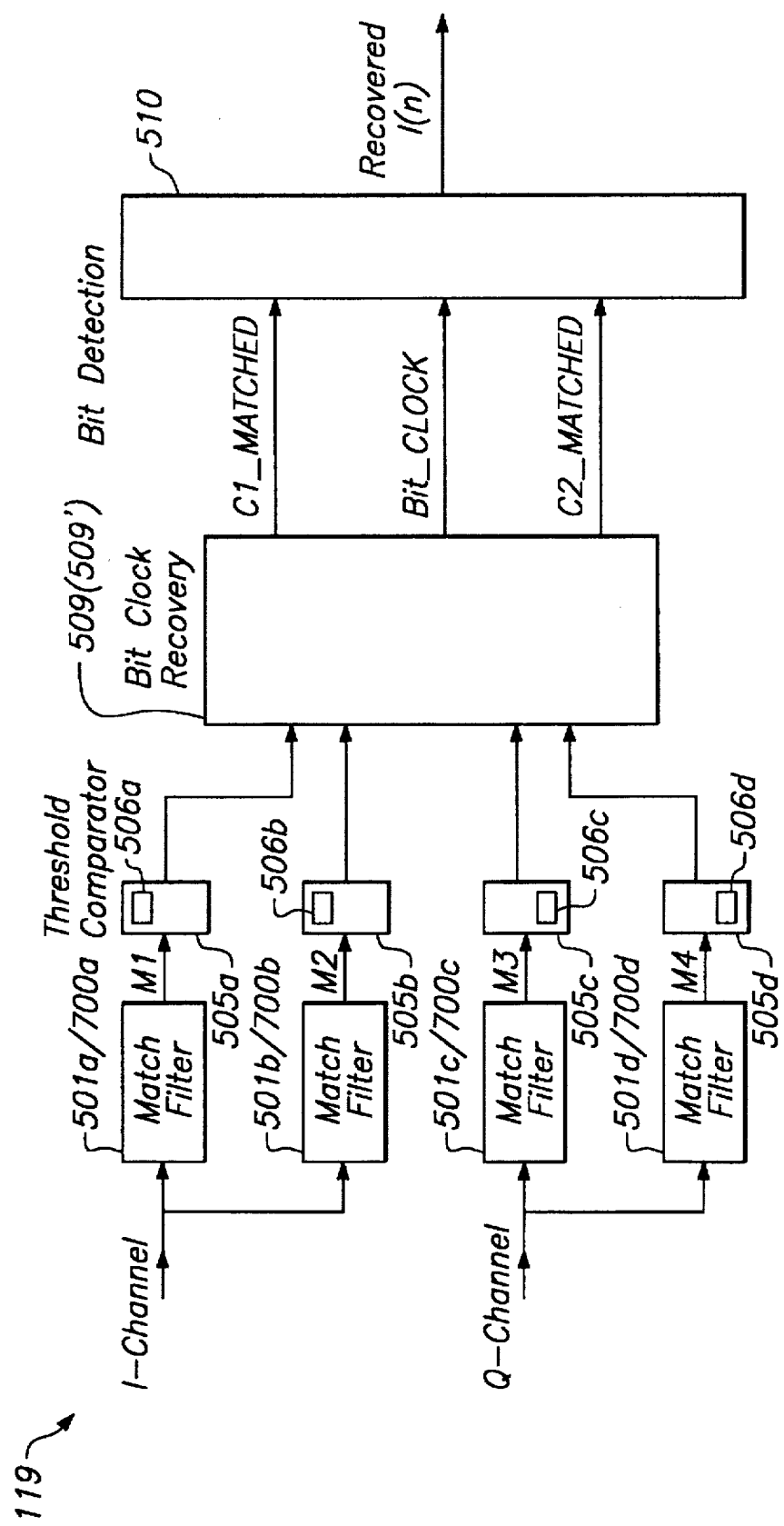
FIG. 5 is a block diagram of a signal processing circuit 119 in accordance with the BPSK transceiver 100 of FIG. 2.

90 degree hybrid 114 has two outputs, a first output producing a first sinusoid (cos ω't) having a zero phase shift and a second output producing a second sinusoid (cos(ω't−π)=sin(ω't)) phase shifted by 90 degrees relative to the first sinusoid. On the I-channel, receiver mixer 112 mixes amplified signal $S(t)\cos(\omega t+\phi)$ with cos(ω't) to downconvert the amplified signal to baseband. Because ω≠ω', the downconverted signal has a sinusoidal envelope having a frequency $\Delta\omega$. Similarly, on the Q-channel, receiver mixer 113 modulates amplified signal $S(t)\cos(\omega t+\phi)$ with sinω't to downconvert the amplified signal to baseband. Again, because ω≠ω', the downconverted signal has a sinusoidal envelope having a frequency $\Delta\omega$. The envelopes of the downconverted I and Q channels have a 90 degree phase difference. The outputs of receiver mixers 112, 113 are coupled to low pass filters 115 and 116. Low pass filters 115 and 116 filter the baseband I and Q-channel signals and couple the filtered baseband signals to baseband amplifiers 117, 118. Analog-to-digital converters (ADCs) 123, 124 are coupled to the outputs of baseband amplifiers 117, 118 and sample the baseband signals at a sample rate of at least twice the chip rate. Thus, in the preferred embodiment, analog-to-digital converters 123, 124 sample at at least 22 MHz. In a first embodiment, analog-to-digital converters 123, 124 are 1-bit ADCs. In alternate embodiments, analog-to-digital converters 123, 124 have other bit resolutions such as 8 or 16 bits. Signal processing circuit 119 is coupled to the outputs of analog-to-digital converters 123, 124 and recovers information signal I(n) from the digitized I- and Q-Channel baseband signals. In the preferred embodiment, signal processing circuit 119 is implemented on a single integrated circuit. FIG. 5 illustrates signal processing circuit 119 of the present invention. Signal processing circuit 119 includes four matched filters 501*a*–501*d*, four threshold comparators 505*a*–505*d*, bit clock recovery circuit 509 and bit detector 510. Signal processing circuit 119 processes the baseband I- and Q-Channels and recovers information signal I(n) without requiring any frequency locking circuitry.

Figure 6:
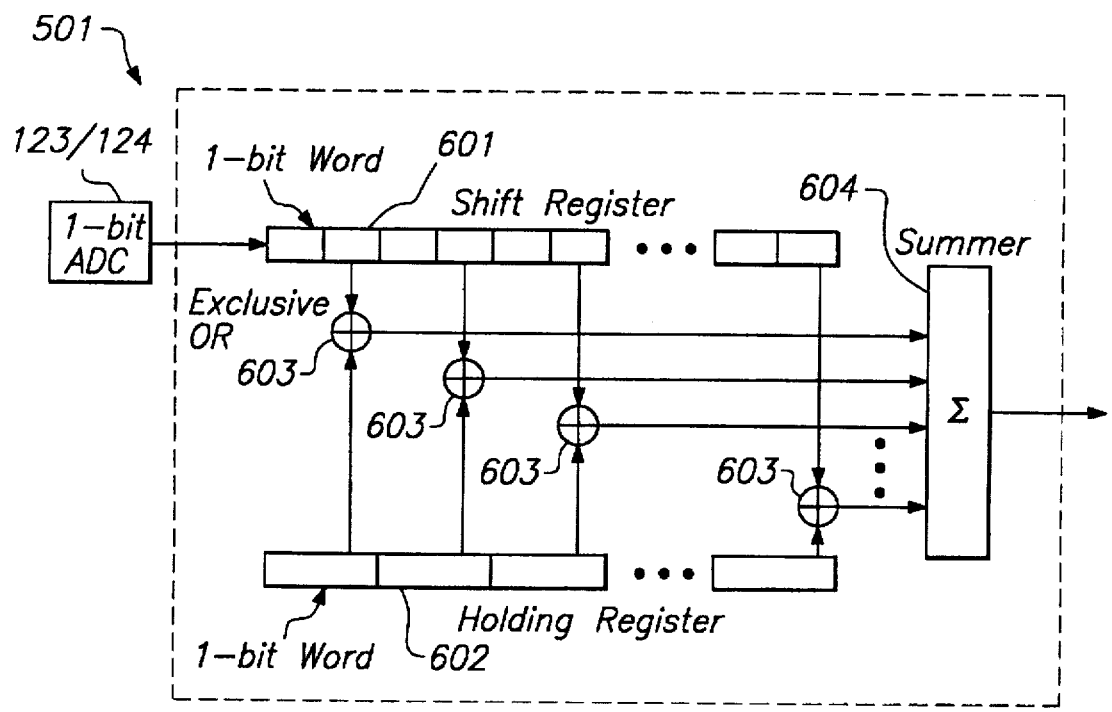
FIG. 6 is a block diagram of a matched filter 501 to be coupled to 1-bit resolution analog-to-digital converters in accordance with signal processing circuit 119 of FIG. 5 and signal processing circuit 919 of FIG. 10.

There is illustrated in FIG. 6, a block diagram of matched filter 501 (501*a*–501*d*) in accordance with the present invention. Each matched filter 501*a*–501*d* has a bank of cascaded shift registers 601, a holding register 602, "exclusive OR" gates 603 and summer 604. Every other bit of cascaded shift register 601 is "exclusive-ORed" with a corresponding bit of the chip code ($C_1$ or $C_2$) which is stored in the holding register 602. Because each of the I- and Q-channels are sampled at twice the bit rate, only every other sample of cascaded shift register 601 need be tapped for "exclusive OR-ing." The "exclusive OR" outputs are summed by summer 604 to generate a correlation value. As the digitized sequence on each of the I- and Q-channels slides past and is correlated with chip sequences $C_1$ and $C_2$, the correlation values will remain relatively small (5 or less) unless either channel detects the chip sequence $C_1$ or $C_2$, in which case the correlation values will be 11.

Figure 7:
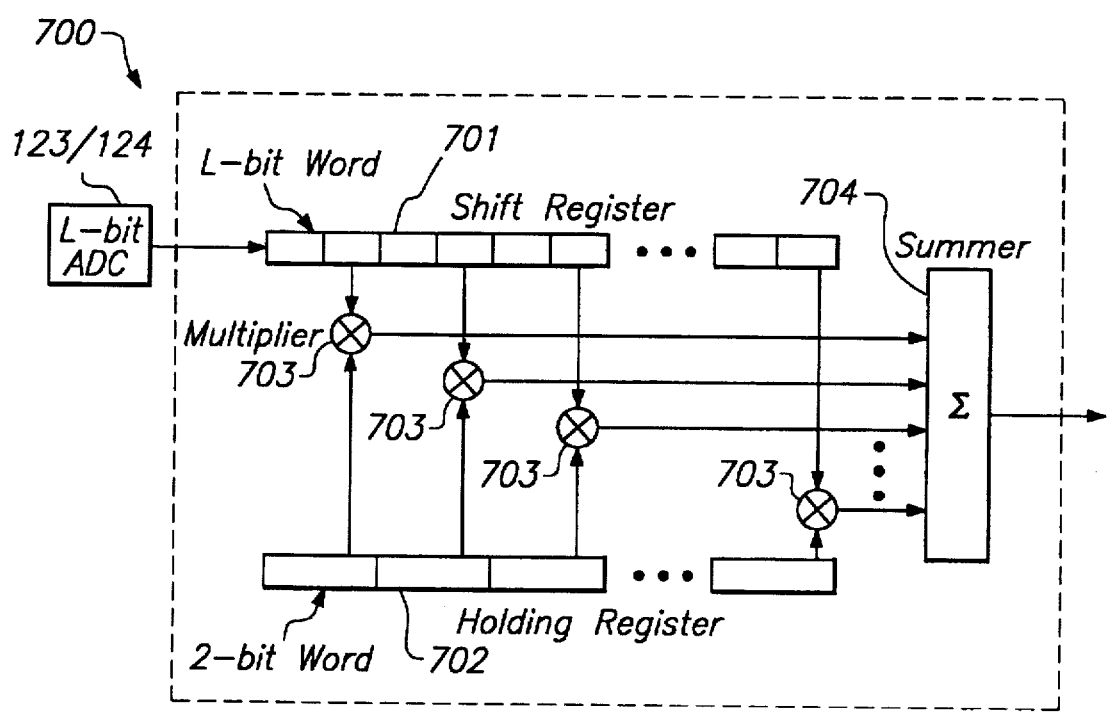
FIG. 7 is a block diagram of a matched filter 700 to be coupled to L-bit resolution analog-to-digital converters in accordance with the signal processing circuit 119 of FIG. 5 and signal processing circuit 919 of FIG. 10.

Alternate embodiments of transceiver 100 use analog-to-digital converters 123, 124 having a resolution greater than 1-bit, for example "L-bits" where L can be any number of bits greater than 1. These alternate embodiments use a matched filter 700 rather than matched filter 501. Matched filter 700 is illustrated in FIG. 7. Matched filter 700 has a cascaded shift register 701, holding register 702, multiplier 703 and summer 704. Cascaded shift register 701 performs a word-based shift where each word is L bits. Holding register 702 stores a modified version of either chip code $C_1$ or chip code $C_2$ where each chip is represented by two bits: a "1" for a 1 chip and a "−1" for a 0 chip. Every other word of cascaded shift register 701 is multiplied with the corresponding bits of the chip code ($C_1$ or $C_2$) stored in the holding register 702. Because each of the I- and Q-channels are sampled at twice the bit rate, only every other sample of cascaded shift register 701 need be tapped for multiplication. The multiplier outputs are summed by summer 704 to generate a correlation value. As the digitized sequence on each of the I- and Q-channels slides past and is correlated with chip sequences $C_1$ and $C_2$, the correlation values will remain relatively small unless either channel detects the chip sequence $C_1$ or $C_2$, in which case the correlation values will be above a predetermined threshold value.

Referring again to FIG. 5, matched filters 501*a* and 501*b* are coupled to the I-Channel and correlate the I-channel baseband signal with chip sequences $C_1$ and $C_2$ respectively. Similarly, matched filters 501*c* and 501*d* are coupled to the Q-Channel and correlate the Q-Channel baseband signal with chip sequences $C_1$ and $C_2$ respectively. Matched filter outputs $M_1$, $M_2$, $M_3$ and $M_4$ correspond to the outputs of matched filters 501*a*–501*d* respectively and have values of less than 11 unless the baseband symbol is aligned with and correlates to the respective chip sequence $C_1$ or $C_2$.

Both the I- and Q-channels have an amplitude envelope that oscillates at $\Delta\omega$ and therefore, both channels have regions of information loss where the amplitude of the baseband square waves is attenuated below the voltage threshold required for digital logic. Because the envelopes of the I- and Q-channels are 90 degrees out of phase however, the regions of information loss do not overlap, and thus symbol information can be decoded from the alternative I- or Q-channel. Matched filters 501*a* and 501*c* correlate the I- and Q-channels with chip sequence $C_1$, and matched filters 501*b* and 501*d* correlate the I- and Q-channels with chip sequence $C_2$. Thus, if chip sequence $C_1$ is transmitted, then the results of either matched filter 501*a* or matched filter 501*c* will indicate correlation. Similarly, if chip sequence $C_2$ is transmitted, then the results of either matched filter 501*b* or matched filter 501*d* will indicate correlation.

Matched filter outputs $M_1$, $M_2$, $M_3$ and $M_4$ are coupled to threshold comparators 505*a*–505*d* respectively. Threshold comparators 505*a*–505*d* generate signals responsive to the received signals having binary values greater than or equal to a predetermined threshold value 506*a*–506*d*. In the preferred embodiment the predetermined threshold values 506a–506d for each of the comparators 505a–505d are all equal to eight. The output of threshold comparators 505a–505d are each either a "1" or a "0" responsive to the comparison and is coupled to bit clock recovery circuit 509. Specifically, threshold comparators 505a and 505c generate a "1" on detection of symbol $C_1$ and threshold comparators 505b and 505d generate a "1" on detection of symbol $C_2$.

Figure 8A:
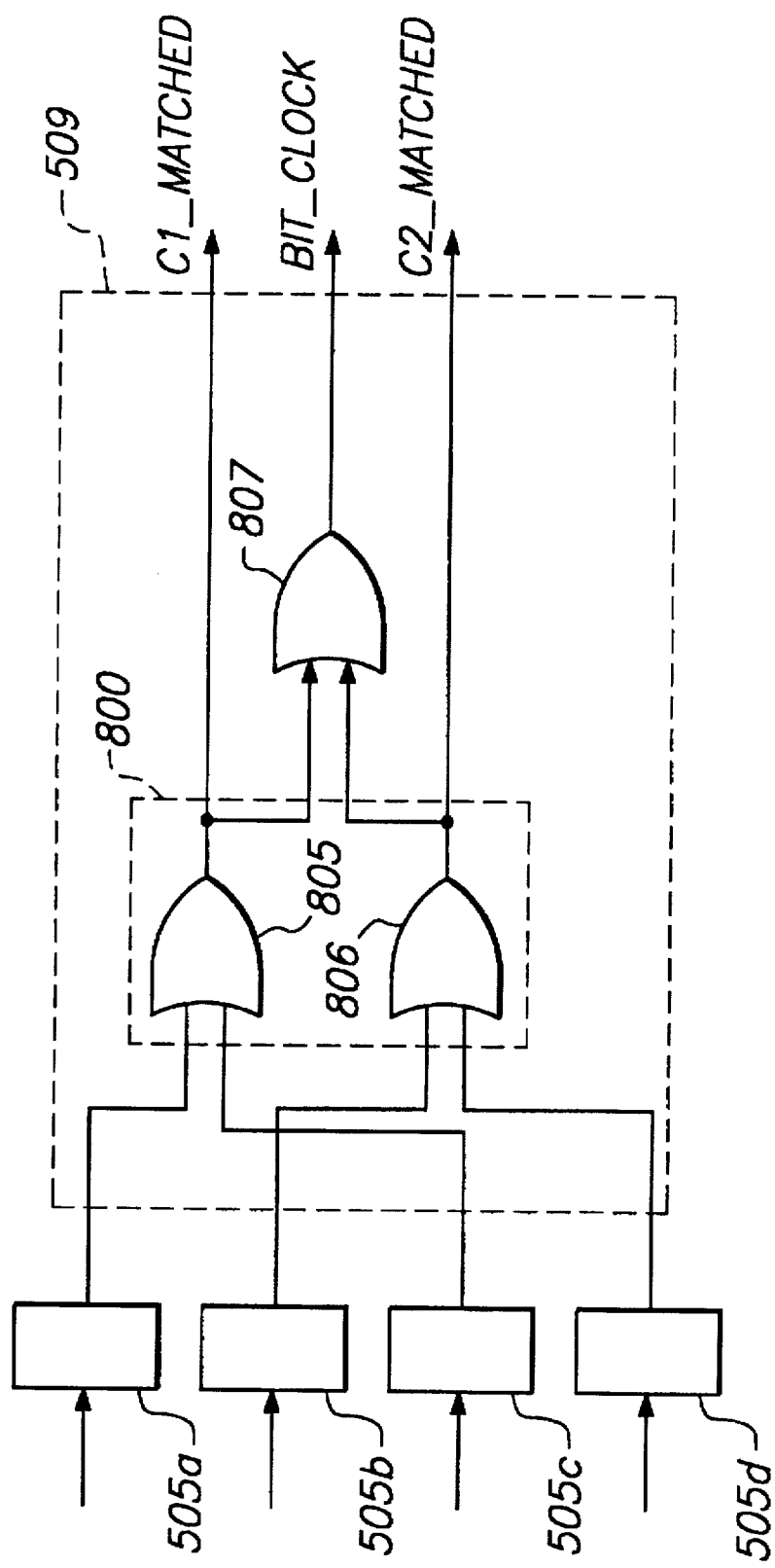
FIG. 8A is a block diagram of a bit clock detection circuit 509 in accordance with the signal processing circuit 119 of FIG. 5 and signal processing circuit 919 of FIG. 10.

Bit clock recovery circuit 509 decodes the outputs of threshold comparators 505a–505d and generates three signals: BIT_CLOCK, C1_MATCHED and C2_MATCHED. FIG. 8A illustrates a first embodiment of bit clock recovery circuit 509 in accordance with the present invention. Bit clock recovery circuit 509 recovers the bit clock using a symbol detection circuit 800 comprising "OR" gates 805 and 806. Symbol detection circuit 800 has two outputs corresponding to chip sequence $C_1$ and to chip sequence $C_2$ respectively. Each output changes to a first state indicating a detection of the corresponding chip sequence. Specifically, the output of "OR" gate 805 will be "High" or a logical "1" if either or both of the outputs of threshold detectors 505a and 505c indicate detection (correlation) of symbol $C_1$. Similarly, the output of "OR" gate 805 will be "High" or a logical "1" if either or both of the outputs of threshold detectors 505b and 505d indicate detection (correlation) of symbol $C_2$. "OR" gate 807 is a clock generator and performs a logical "OR" function on the outputs of "OR" gates 805 and 806 to generate the BIT_CLOCK signal.

Figure 8B:
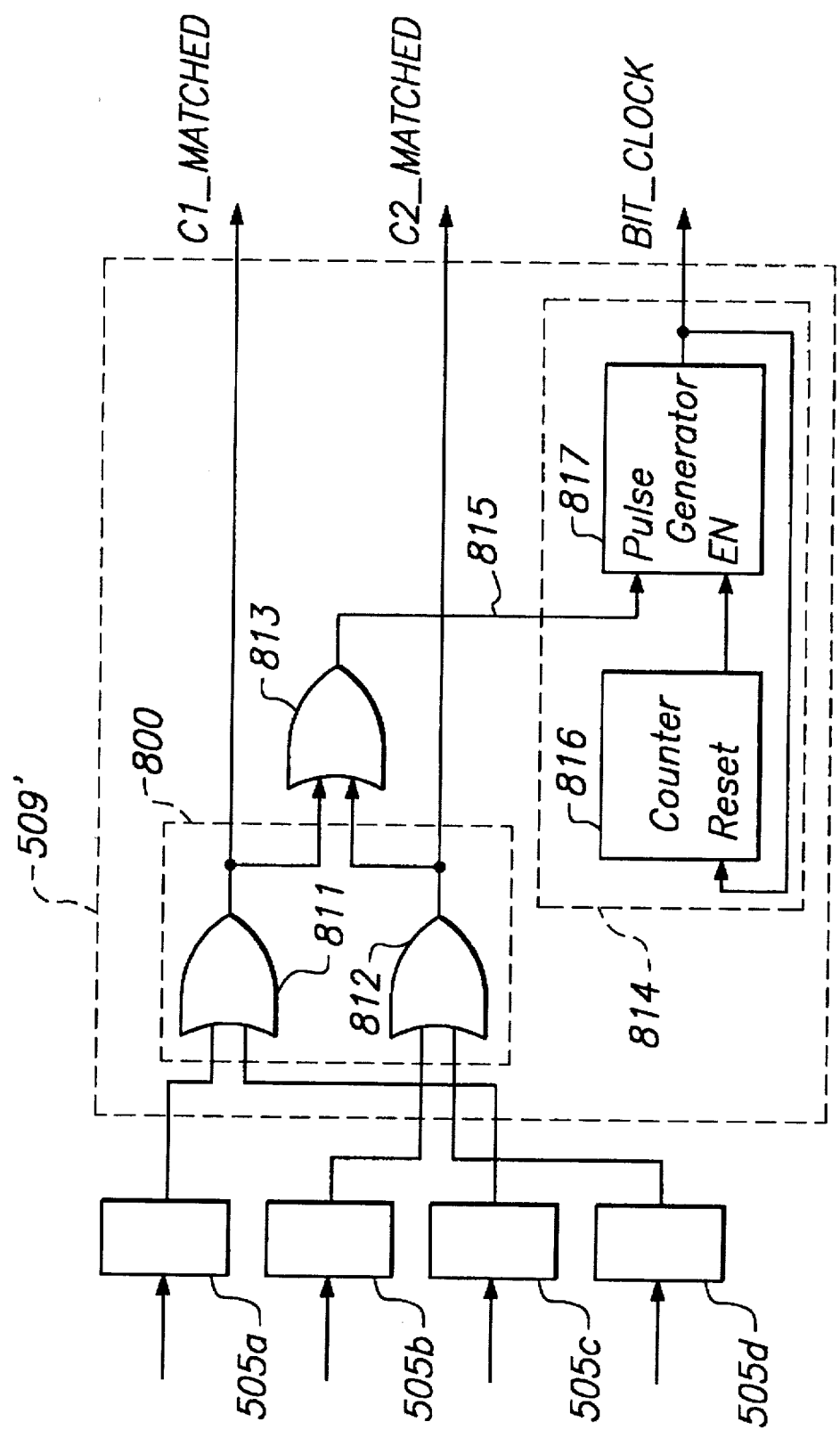
FIG. 8B is a block diagram of an alternative embodiment of a bit clock detection circuit 509' in accordance with the the signal processing circuit 119 of FIG. 5 and signal processing circuit 919 of FIG. 10.

FIG. 8B illustrates an alternative embodiment of a bit clock recovery circuit 509' in accordance with the present invention. In addition to having symbol detection circuit 800, clock generator "OR" gate 813, bit clock recovery circuit 509' has a validation circuit 814. "OR" gate 811 is coupled to the C1 matched filter outputs of the I- and Q-channels and "OR" gate 812 is coupled to the C2 matched filter outputs of the I- and Q-channels. Additionally, the outputs of "OR" gates 811, 812 are coupled to bit detector 510. "OR" gate 813 is coupled to the output of "OR" gates 811, 812 and to validation circuit 814. Signal line 815 remains "0" unless any of the threshold comparators outputs a "1" indicating symbol alignment and detection. A "0" on the signal line 815 indicates that neither the $C_1$ nor the $C_2$ symbols are presently detected and a "1" indicates that either a $C_1$ or a $C_2$ symbol has been detected. C1_MATCHED and C2_MATCHED remain low unless a $C_1$ or a $C_2$ symbol is presently detected. To reduce the risk of a false symbol detection, validation circuit 814 creates a time window for detecting a bit clock cycle. Validation circuit 814 has a counter 816 and a pulse generator 817. Pulse generator 817 generates a bit clock signal responsive to detection of a pulse on signal line 815. Signal line 815 pulses high each time any one of the four matched filter correlators produces an output exceeding a predetermined threshold. A high pulse on signal line 815 generally indicates the detection of a symbol. In a particularly noisy environment however, an erroneous high pulse on signal line 815 may be generated. Validation circuit 814 reduces the probability of having a false detection as a result of an erroneous pulse on signal 815 by generating a limited time window in which pulse generator 817 responds to pulses on signal line 815. Counter 816 has an output coupled to the enable input of pulse generator 817. Counter 816 is reset after each symbol detection to a predetermined count value such as 19 or 20 counts. During the count cycle, counter 816 disables pulse generator 817 so that it will be insensitive to pulses on line 815 and at the end of the count cycle, counter 816 enables pulse generator 817 so that any pulses on signal line 815 will generate a bit clock cycle.

Bit detector 510 receives the BIT_CLOCK, C1_MATCHED and C2_MATCHED signals from bit clock recovery circuit 509 (509') and generates the recovered bit sequence I(n). In the preferred embodiment bit detector 510 is an edge-triggered flip-flop having a clock input coupled to the BIT_CLOCK and a latching input coupled to the C1_MATCHED signal.

III. Transmitting Apparatus and Method using QPSK Modulation

Figure 9:
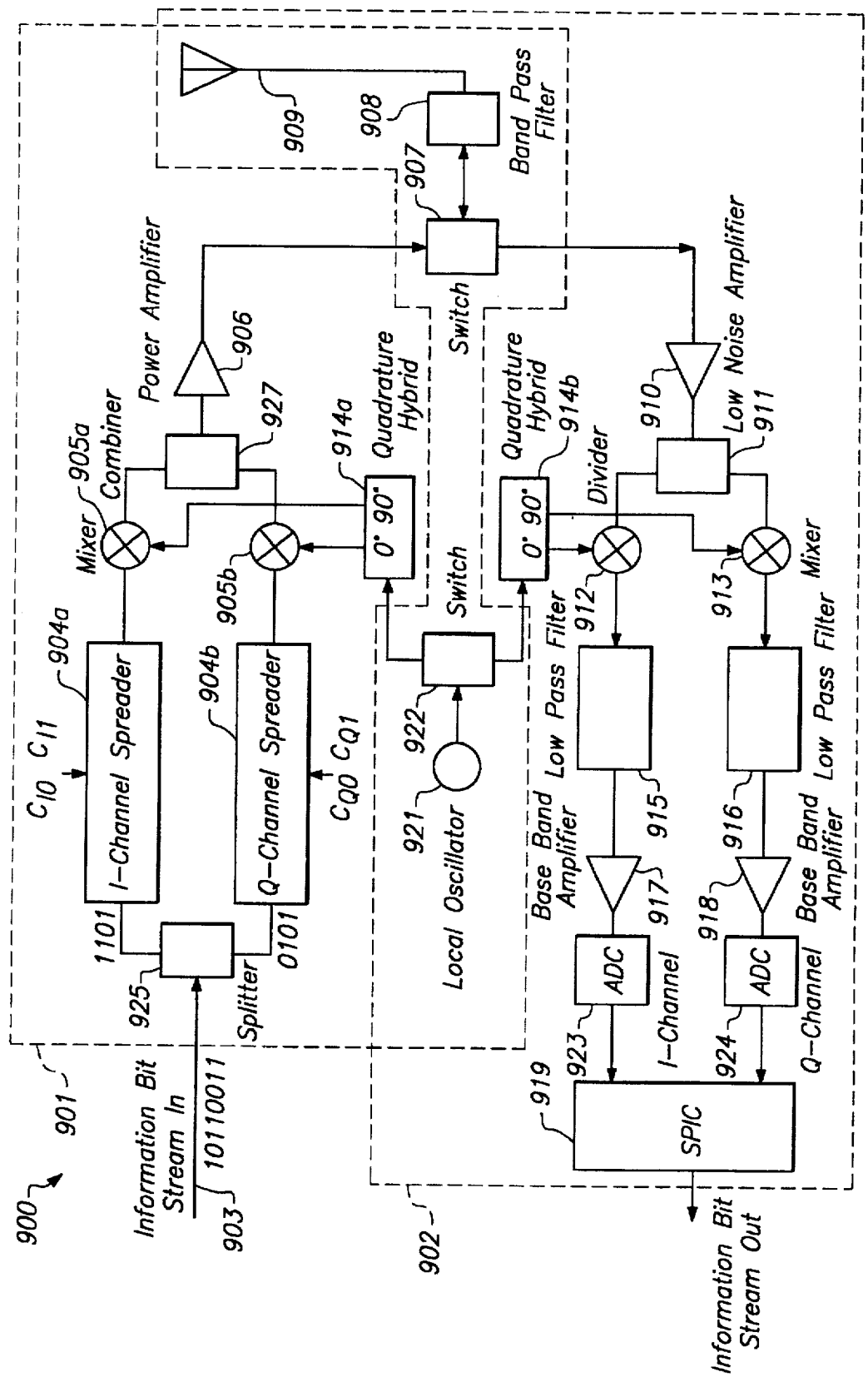
FIG. 9 is a block diagram of a QPSK transceiver 900 in accordance with the present invention.

The principles of the present invention apply equally to a transceiver using quadrature phase shift keyed (QPSK) modulation. FIG. 9 is a block diagram of a spread spectrum transceiver 900 in accordance with the present invention. Transceiver 900 includes a transmitter 901 and a receiver 902. Transmitter 901 and receiver 902 form a half-duplex transceiver and thus share circuit components such as local oscillator 921, local oscillator switch 922, antenna 909, bandpass filter 908, and antenna switch 907. In addition to the shared circuit components, transmitter 901 includes input port 903, splitter 925, spreaders 904a, 904b, mixers 905a, 905b, 90 degree hybrid 914a, combiner 927 and transmitter amplifier 906. In addition to the shared circuit components, receiver 902 includes receiver amplifier 910, splitter 911, mixers 912, 913, 90 degree hybrid 914b, low pass filters 915, 916, baseband amplifiers 917, 918, analog-to-digital converters 923, 924 and signal processing circuit 919. Transceiver 900 operates in a half duplex mode to send and receive digital communication signals using a direct sequence spread spectrum technique and QPSK modulation. Narrow-band information bearing signal I(n) is frequency spread, modulated and then transmitted by transmitter 901 of a first transceiver. The transmitted signal is received, downconverted and then decoded by a receiver 902 of a second, remotely placed transceiver.

A narrow-band information-bearing digital signal I(n) is received at input port 903 from an information signal source. Splitter 925 is coupled to input port 903 to receive information signal I(n) and alternates coupling each bit of I(n) to spreaders 904a and 904b to divide information signal I(n) across the I- and Q-channels each at half the original bit rate. Spreaders 904a, 904b, therefore each receive every other bit of I(n). Spreader 904a for example, receives the odd numbered bits I(2n–1) and spreader 904b receives the even numbered bits I(2n).

Spreader 904a frequency spreads that data on the I-channel by substituting each "0" bit with chip sequence $C_{I0}$ and each "1" bit with chip sequence $C_{I1}$ thereby forming a first frequency spread bit stream. Similarly, spreader 904b frequency spreads that data on the Q-channel by substituting each "0" bit with chip sequence $C_{Q0}$ and each "1" bit with chip sequence $C_{Q1}$ thereby forming a second frequency spread bit stream. As in the BPSK modulating transceiver 100 described above, the chip sequences $C_{I0}$, $C_{Q0}$, $C_{I1}$ and $C_{Q1}$ are mutually orthogonal and thus each of the possible paired combinations of $C_{I0}$, $C_{Q0}$, $C_{I1}$ and $C_{Q1}$ have small-valued cross-correlation values. Additionally, each has a small-valued autocorrelation except when m=0.

The frequency spread I- and Q- bit streams are next used to phase modulate two carrier signals that have the same frequency but at quadrature phase. Referring again to FIG. 9, mixers 905a and 905b are coupled to spreaders 904a and 904b. Mixer 905a is additionally coupled to the 90 degree phase shift Output of phase shifter 914a and mixer 905b is coupled to the zero degree phase shift output of 90 degree hybrid 914a. 90 degree hybrid 914a is coupled to local oscillator 921 via local oscillator switch 922. Local oscillator 921 generates a sinusoidal carrier (cosωt) having a frequency of ω corresponding to the frequency of local oscillator 921. Local oscillator switch 922 has two output terminals T and R coupled to transmitter and receiver 901, 902 respectively. Local oscillator switch 922 couples the local oscillator signal to the transmit path when transceiver 900 is in transmit mode and to the receive path when transceiver 900 is in receive mode.

Mixers 905a, 905b, local oscillator 921, local oscillator switch 922, 90 degree hybrid 914a and combiner 927 together form a QPSK modulator. 90 degree hybrid 914a has two outputs, a first output producing a first sinusoid (cos ωt) having a zero phase shift and a second output producing a second sinusoid (cos(ωt−π)=sin(ωt)) phase shifted by 90 degrees relative to the first sinusoid. Mixer 905a mixes cosωt with frequency spread signal $S_I(n)$ to produce $S_I(t)$ cosωt. Mixer 905b mixes oscillator signal sinωt with the spread signal $S_Q(n)$ to produce $S_Q(t)$sinωt. Combiner 927 combines the I- and Q-channels to form QPSK signal:

$$S_I(t)\cos\omega t + S_Q(t)\sin\omega t$$

Transmitter amplifier 906 is coupled to the output of combiner 927 and amplifies QPSK signal $S_I(t)\cos\omega t + S_Q(t)\sin\omega t$ to produce a transmission signal. Amplifier 906 is coupled to antenna switch 907. Antenna switch 907 has two terminals T and R coupled to transmitter and receiver 901, 902 respectively. When transceiver 900 is in transmit mode, bandpass filter 908 and antenna 909 are coupled to the transmit path. When coupled to the transmit path, bandpass filter 908 filters the transmission signal and couples the filtered signal to antenna 909 for radiation.

IV. Receiving Apparatus and Method using QPSK Modulation

A corresponding transceiver 900, set to receive mode, is equipped to receive and demodulate the radiated QPSK direct sequence spread spectrum signal. When transceiver 900 is in receive mode, antenna 909 and bandpass filter 908 are coupled to the receive path by switch 907. The signal received by antenna 909 has an arbitrary and unknown phase shift o due to signal propagation delay and other factors, and therefore the received signal may be expressed as $S_I(t)\cos(\omega t+\phi)+S_Q(t)\sin(\omega t+\phi)$. The received signal is filtered using bandpass filter 908 which couples antenna 909 to receiver amplifier 910. Receiver amplifier 910 is a low noise amplifier with automatic gain control for amplifying the filtered signal to a desired level. Receiver amplifier 910 is coupled to power divider 911. Power divider 911 is an in-phase splitter that splits the amplified signal to couple the amplified signal $(S_I(t)\cos(\omega t+\phi)+S_Q(t)\sin(\omega t+\phi))$ to both the I- and Q-channels for downconversion and baseband processing.

Receiver 902 has a 90 degree hybrid 914b coupled to one output terminal (the R terminal) of local oscillator 921. Local oscillator 921 generates a sinusoid (cos ω't) having a frequency ω'. The frequency ω of the local oscillator of the transmitting transceiver and the frequency ω' of local oscillator 921 of receiving transceiver vary within a specified tolerance range as described in reference to the receiving apparatus and method using BPSK modulation. The frequency difference between ω and ω' is expressed as:

$$\Delta\omega = \omega - \omega'$$

It should be noted that ω and ω' vary by no more than twice the tolerance specified in the design of the local oscillator circuit 921 on each of the transceivers.

90 degree hybrid 914b has two outputs, a first output producing a first sinusoid (cos ω't) having a zero phase shift and a second output producing a second sinusoid sin(ω't) phase shifted by 90 degrees relative to the first sinusoid. On the I-channel, mixer 912 mixes amplified signal $S(t)\cos(\omega t+\phi)$ with cos(ω't) to downconvert the amplified signal to baseband. Because ω≠ω', the downconverted signal has a sinusoidal envelope having a frequency Δω. Similarly, on the Q-channel, mixer 913 modulates amplified signal $S(t)\cos(\omega t+\phi)$ with sinω't to downconvert the amplified signal to baseband. Again, because ω≠ω', the downconverted signal has a sinusoidal envelope having a frequency Δω. The envelopes of the downconverted I- and Q-channels have a 90 degree phase difference.

The outputs of receiver mixers 912, 913 are coupled to low pass filters 915 and 916. Low pass filters 915 and 916 filter the baseband I- and Q-channel signals and couple the filtered baseband signals to baseband amplifiers 917, 918. Analog-to-digital converters (ADCs) 923, 924 are coupled to the outputs of baseband amplifiers 917, 918 and sample the baseband signals at a sample rate of at least twice the chip rate. Thus, in the preferred embodiment, analog-to-digital converters 923, 924 sample at a rate of at least twice the chip rate and analog-to-digital converters 923, 924 have L-bit resolution where L>1, for example 8 or 16 bits.

Figure 10:
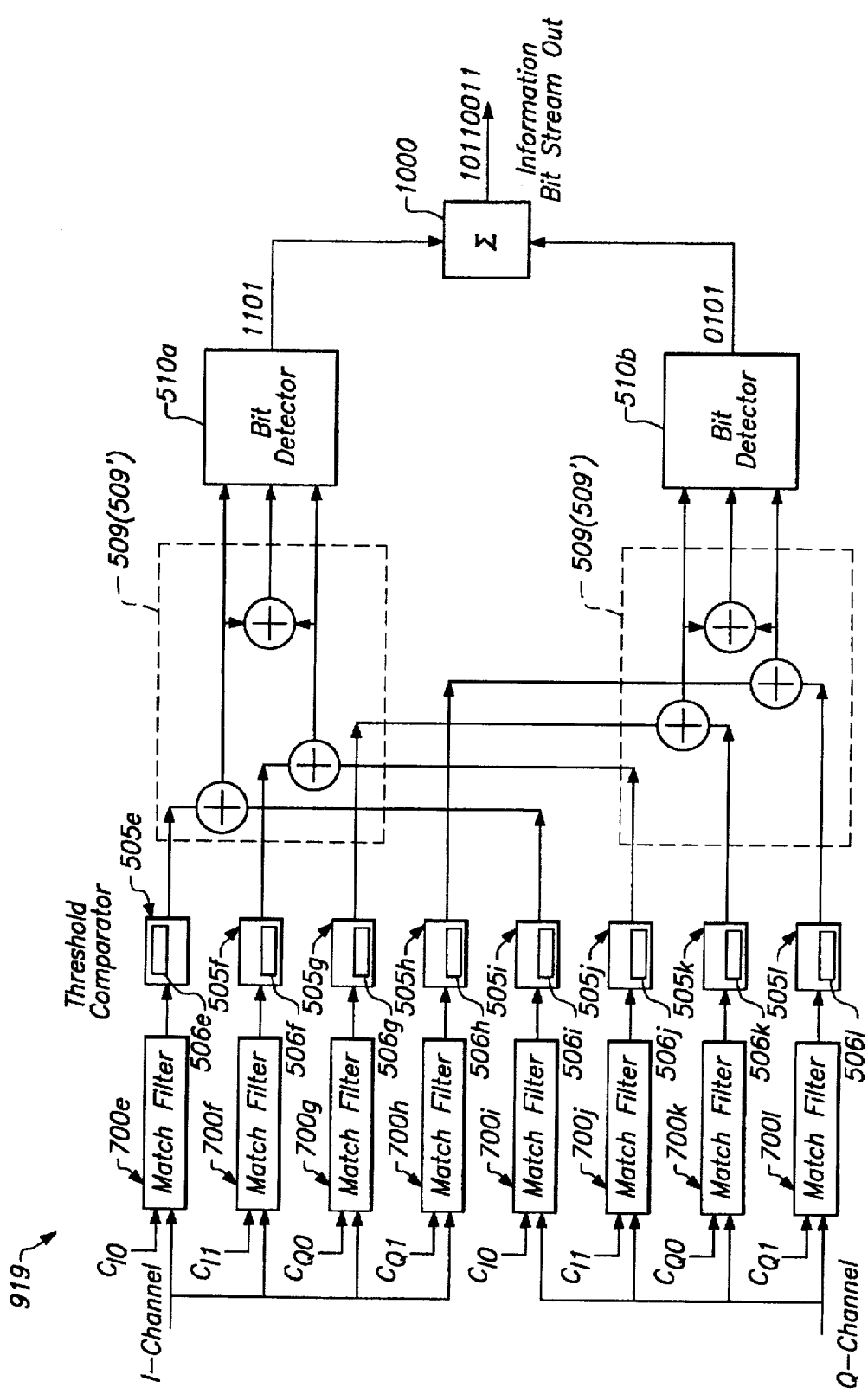
FIG. 10 is a block diagram of a signal processing circuit 919 in accordance with the present invention.

Signal processing circuit 919 is coupled to the outputs of analog-to-digital converters 923, 924 and recovers information signal I(n) from the digitized I- and Q-channel baseband signals. In the preferred embodiment, signal processing circuit 919 is implemented on a single integrated circuit. FIG. 10 illustrates signal processing circuit 919 of the present invention. Signal processing circuit 919 includes eight matched filters 700e–700l, eight threshold comparators 505e–505l, bit clock recovery circuits 509 (509'), bit generators 510a, 510b and combiner 1000. Signal processing circuit 919 processes the baseband I and Q-channels and recovers information signal I(n) without requiring any frequency locking circuitry.

Each of matched filters 700e–700l, as illustrated in FIG. 7 and described in reference to the BPSK embodiment, uses a bank of L-bit word-based cascaded shift registers, a holding register, multipliers and a summer to generate correlation values between the received digital signal and preselected chip sequences. Matched filters 700e–700h are coupled to the I-channel and correlate the I-channel baseband signal with chip sequences $C_{I0}$, $C_{Q0}$, $C_{I1}$ and $C_{Q1}$ respectively. Similarly, matched filters 700i–700l are coupled to the Q-channel and correlate the Q-channel baseband signal with chip sequences $C_{I0}$, $C_{Q0}$, $C_{I1}$ and $C_{Q1}$ respectively. The matched filter outputs have values below a predetermined threshold unless the baseband symbol is aligned with and correlates to the associated chip sequence $C_{I0}$, $C_{Q0}$, $C_{I1}$ or $C_{Q1}$.

Both the I and Q channels have an amplitude envelope that oscillates at Δω and therefore, both channels have regions of information loss where the amplitude of the baseband square waves is attenuated below the voltage threshold required for digital logic. Because the envelopes of the I- and Q-channels are 90 degrees out of phase however, the regions of information loss do not overlap, and thus symbol information can be decoded from the alternate channel I- or Q-channel. Matched filters 700e and 700i correlate the I- and Q-channels with chip sequence $C_{I0}$, matched filters 700f and 700j correlate the I- and Q-channels with chip sequence $C_{I1}$, matched filters 700g and 700k correlate the I and Q-channels with chip sequence $C_{Q0}$ and matched filters 700h and 700l correlate the I- and Q-channels with chip sequence $C_{Q1}$. Thus, if any chip sequence $C_{I0}$, $C_{Q0}$, $C_{I1}$ and $C_{Q1}$ is transmitted, then the results of either the I-channel matched filter bank or the Q-channel matched filter bank will indicate correlation.

The matched filter outputs are coupled to threshold comparators 505e–505l respectively. Threshold comparators 505e–505l generate signals responsive to the received signals having values greater than or equal to predetermined threshold values 506e–506l. The outputs of threshold comparators 505e–505l are either a "1" or a "0" responsive to the comparison and are coupled to bit clock recovery circuits 509 (509'). Specifically, on detection of symbol $C_{I0}$, either threshold comparator 505e or 505i generates a "1." On detection of symbol $C_{I1}$, either threshold comparator 505f or 505j generates a "1." On detection of symbol $C_{Q0}$, either threshold comparator 505g or 505k generates a "1" and on detection of symbol $C_{Q1}$, either threshold comparator 505h or 505l generates a "1."

Bit clock recovery circuits 509 (509') have the same structure and function as illustrated in FIGS. 8A and 8B and as described in reference to the BPSK demodulation scheme of the present invention. As described in the BPSK embodiment, either bit clock receiver circuit 509 or bit clock recovery circuit 509' having additional validation circuitry 814 may be used in practice of the present invention. Bit clock recovery circuits 509 (509') each decodes the outputs of the corresponding threshold comparators to generate the BIT_CLOCK, CI0_MATCHED, CI1_MATCHED, BIT_CLOCK Q, CQ0_MATCHED and CQ1_MATCHED signals which are coupled to bit detectors 510a, 510b.

Bit detectors 510a and 510b have the same function and structure as illustrated and described in reference to FIG. 5. As in the BPSK embodiment, each of bit detectors 510a and 510b comprises an edge triggered flip-flop having a clock input coupled to the BIT_CLOCK signal and having a latch input coupled to CI0_MATCHED and CQ0_MATCHED respectively.

Combiner 1000 combines the outputs of bit detectors 510a and 510b by multiplexing the two bit streams to form a single interleaved data stream that is the recovered information signal I(n). Predetermined preamble symbol sequences in the I and Q channel transmissions can be used to provide a timing reference in the receiver for multiplexing or interleaving the received I and Q bit streams.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and Scope of the invention.

What is claimed is:

1. A method for recovering a digital signal comprising a sequence of bits having a first and second state from a direct sequence spread spectrum phase shift keyed signal wherein each bit in the first state is substituted by one of a first set of chip sequences and each bit in the second state substituted by a one of a second set of chip sequences, the method comprising the steps of:

demodulating the direct sequence spread spectrum signal to form an in-phase baseband signal and a quadrature-phase baseband signal;

correlating the in-phase baseband signal with each chip sequence of the first set of chip sequences to generate a first set of correlation values;

correlating the in-phase baseband signal with each chip sequence of the second set of chip sequences to generate a second set of correlation values;

correlating the quadrature-phase baseband signal with each chip sequence of the first set of chip sequences to generate a third set of correlation values;

correlating the quadrature-phase baseband signal with each chip sequence of the second set of chip sequences to generate a fourth set of correlation values;

comparing each correlation value to a corresponding threshold value;

responsive to any of the first and third correlation values being greater than the corresponding threshold values, indicating a first bit state detection; and responsive to any of the second and fourth correlation values being greater than the corresponding threshold values, indicating a second bit state detection.

2. The method of claim 1 wherein the phase shift keyed signal is a binary phase shift keyed signal.

3. The method of claim 1 wherein the phase shift keyed signal is a quadrature phase shift keyed signal.

4. A method for recovering a digital signal comprising a sequence of bits having a first and second state from a direct sequence spread spectrum binary phase shift keyed (BPSK) signal wherein each bit in the first state is substituted by a first chip sequence and each bit in the second state is substituted by a second chip sequence, the method comprising the steps of:

demodulating the direct sequence spread spectrum BPSK signal to form an in-phase baseband signal and a quadrature-phase baseband signal;

correlating the in-phase baseband signal with the first and second chip sequences to generate a first and a second correlation value respectively;

correlating the quadrature-phase baseband signal with the first and second chip sequence to generate a third and a fourth correlation value respectively;

comparing each correlation value to a corresponding threshold value;

responsive to either of the first and third correlation values being greater than the corresponding threshold values, indicating a first bit state detection; and responsive to either of the second and fourth correlation values being greater than the corresponding threshold values, indicating a second bit state detection.

5. The method of claim 4 wherein the steps of indicating a first bit state detection and indicating a second bit state detection comprise the steps of:

responsive to any of the correlation values being greater than the corresponding threshold values, generating a symbol clock pulse;

responsive to either of the first and third correlation values being greater than the corresponding threshold value, generating a first bit state detect pulse;

responsive to any of the second and fourth correlation values being greater than the corresponding threshold value, generating a second bit state detect pulse;

for each symbol clock pulse, detecting one of the first and second bit state detect pulses;

setting an output signal to the first bit state responsive to detection of the first bit state detect pulse; and setting an output signal to the second bit state responsive to detection of the second bit state detect pulse.

6. A method for recovering a digital signal comprising a sequence of interleaved I-Channel and Q-Channel bits, each having a first and second state, from a direct sequence spread spectrum quadrature phase shift keyed (QPSK) signal wherein each I-Channel bit in the first state is substituted by a first chip sequence, each I-Channel bit in the second state is substituted by a second chip sequence, each Q-Channel bit in the first state is substituted by a third chip sequence and each Q-Channel bit in the second state is substituted by a fourth chip sequence, the method comprising the steps of:

demodulating the direct sequence spread spectrum QPSK signal to form an in-phase baseband signal and a quadrature-phase baseband signal;

correlating the in-phase baseband signal with the first, second, third and fourth chip sequences to generate a first, a second, a third and a fourth correlation value respectively;

correlating the quadrature-phase baseband signal with the first, second, third and fourth chip sequences to generate a fifth, a sixth, a seventh and an eighth correlation value respectively;

comparing each correlation value to a corresponding threshold value;

responsive to any of the first, third, fifth, or seventh correlation values being greater than the corresponding threshold values, indicating a first bit state detection; and responsive to any of the second, fourth, sixth, or eighth correlation values being greater than the corresponding threshold values, indicating a second bit state detection.

7. The method of claim 6 wherein the steps of indicating a first bit state detection and indicating a second bit state detection comprise the steps of:

responsive to any of the correlation values being greater than the corresponding threshold values, generating a symbol clock pulse;

responsive to either of the first and third correlation values being greater than the corresponding threshold value, generating a first bit state detect pulse;

responsive to any of the second and fourth correlation values being greater than the corresponding threshold value, generating a second bit state detect pulse;

for each symbol clock pulse, detecting one of the first and second bit state detect pulses;

setting an output signal to the first bit state responsive to detection of the first bit state detect pulse; and setting an output signal to the second bit state responsive to detection of the second bit state detect pulse.

8. A method for transmitting and receiving a digital signal comprised of bits having first and second states, the method comprising the steps of:

substituting each bit having the first state with a first chip sequence and substituting each bit having a second state with a second chip sequence, to form a spread spectrum signal;

phase modulating a carrier wave with the spread spectrum signal to form a BPSK signal;

transmitting the BPSK signal;

receiving the transmitted BPSK signal;

mixing the received BPSK signal with a first sinusoid having substantially the same frequency as the carrier wave to form an in-phase baseband signal;

mixing the received BPSK signal with a second sinusoid having substantially the same frequency as the carrier wave and having a 90 degree phase shift relative to the first sinusoid to form a quadrature-phase baseband signal;

correlating the in-phase baseband signal with the first and second chip sequences to generate a first and a second correlation value respectively;

correlating the quadrature-phase baseband signal with the first and second chip sequence to generate a third and a fourth correlation value respectively;

comparing each correlation value to a corresponding threshold value;

responsive to either of the first and third correlation values being greater than the corresponding threshold values, indicating a first bit state detection; and responsive to either of the second and fourth correlation values being greater than the corresponding threshold values, indicating a second bit state detection.

9. An apparatus for recovering an information signal from a digitized BPSK direct sequence spread spectrum signal having been downconverted by a non-coherent demodulator to form an in-phase signal on an in-phase channel and a quadrature-phase signal on a quadrature channel, the direct sequence spread spectrum signal being spread using a plurality of chip sequences, the apparatus comprising:

a bank of matched filters having a first plurality of inputs coupled to the in-phase channel and a second plurality of inputs coupled to the quadrature-phase channel, and having a plurality of outputs each having one of a plurality of states responsive to the degree of correlation between an associated input and an associated chip sequence;

a bank of threshold comparators each associated with a chip sequence, the bank having a plurality of inputs coupled to the plurality of matched filter outputs and a plurality of corresponding outputs each having a first state responsive to the corresponding input being greater than a predetermined value and a second state responsive to the corresponding input being less than a predetermined value;

a recovery circuit having a plurality of inputs coupled to the comparator outputs, the recovery circuit having a clock output being in a first state responsive to any one of the inputs being in the first state and being in a second state responsive to all of the inputs being in the second state, the recovery circuit further having a first symbol output being in a first state responsive to any one of the comparator outputs associated with the first chip sequence being in the first state and being in a second state responsive to each of the comparator outputs associated with the first chip sequence being in second state; and a bit detection circuit having a plurality of inputs coupled to the recovery circuit outputs and having an output having a first state responsive to the first symbol being in the first state on a clock state transition and having a second state responsive to all of the inputs being in the second state on a clock state transition.

10. A non-coherent spread spectrum demodulator for coupling to a receiving path and for demodulating a direct sequence spread spectrum signal having a plurality of chip sequences, the demodulator comprising:

an in-phase mixer having an input and an output, the input coupled to the receiving path for converting the direct sequence spread spectrum signal to an in-phase baseband signal;

a quadrature-phase mixer having an input and an output, the input coupled to the receiving path for converting the direct sequence spread spectrum signal to a quadrature-phase baseband signal;

first and second analog-to-digital converters having inputs and outputs, the inputs coupled to the in-phase and quadrature-phase baseband mixer outputs respectively;

for each chip sequence, a matched filter having the associated chip sequence as a first input, having a second input coupled to the output of the first analog-to-digital converter and having a correlation output;

for each chip sequence, a matched filter having the associated chip sequence as a first input, having a second input coupled to the output of the second analog-to-digital converter and having a correlation output;

a plurality of threshold comparators each coupled to a correlation output and each associated with a chip sequence, each threshold comparator having a detect output having a first state responsive to the correlation output being greater than a predetermined value and having a second state responsive to the correlation output being less than the predetermined value;

for each chip sequence, a symbol detect circuit having a plurality of inputs coupled to the detect outputs of the comparators associated with the chip sequence, symbol detect circuit having an output being in a first state responsive to any one of the inputs being in the first state and being in a second state responsive to all of the inputs being in the second state;

a bit clock generator having inputs coupled to the symbol detect circuit outputs and having an output in a first state responsive to any of the inputs being in the first state and having a second state responsive to all of the inputs being in the second state; and a bit generation circuit having an input coupled to the bit clock generator output and a plurality of inputs coupled to the symbol detect circuit outputs for multiplexing the symbol detect circuit outputs.

* * * * *